July 4, 1967  R. T. HOLLERAN  3,329,060
TEMPERATURE COMPENSATED REFRACTOMETER
Filed Aug. 2, 1963  5 Sheets-Sheet 1 bi metallic strip

INVENTOR.
ROBERT T. HOLLERAN
BY
Bean, Brooks, Buckley & Bean
ATTORNEYS

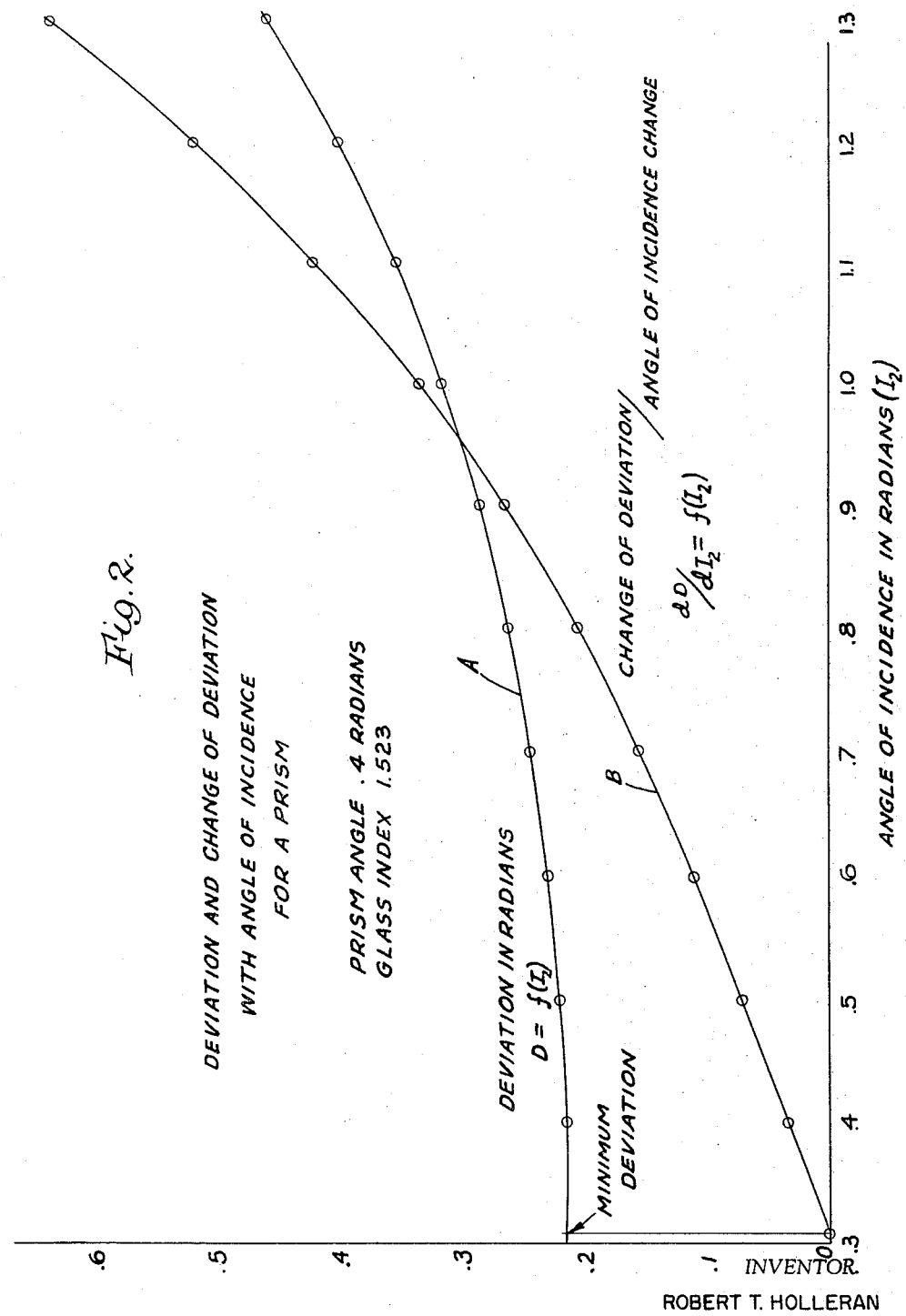

July 4, 1967  R. T. HOLLERAN  3,329,060
TEMPERATURE COMPENSATED REFRACTOMETER
Filed Aug. 2, 1963  5 Sheets-Sheet 3
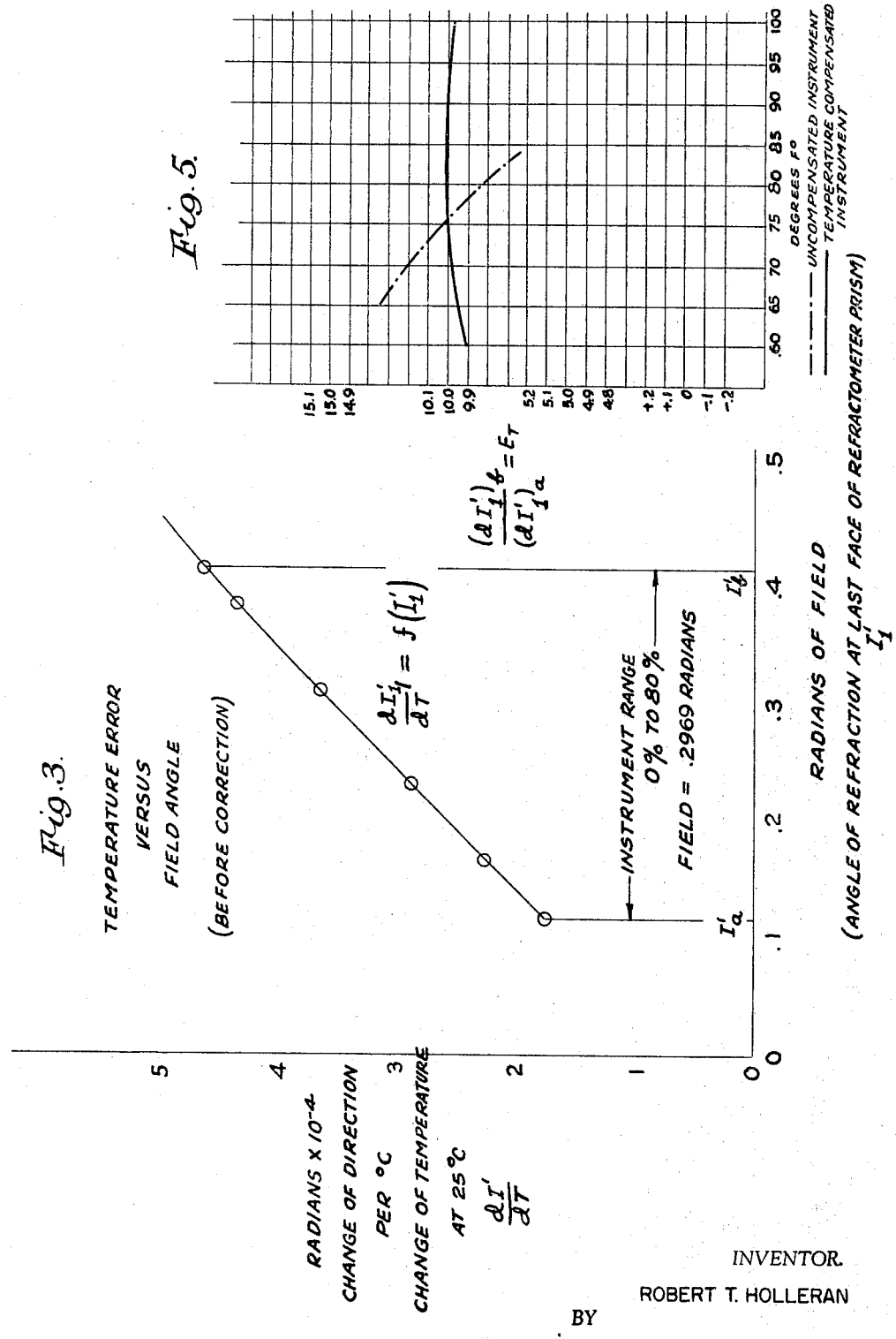
INVENTOR.
ROBERT T. HOLLERAN
BY
Bean, Brooks, Buckley & Bean
ATTORNEYS

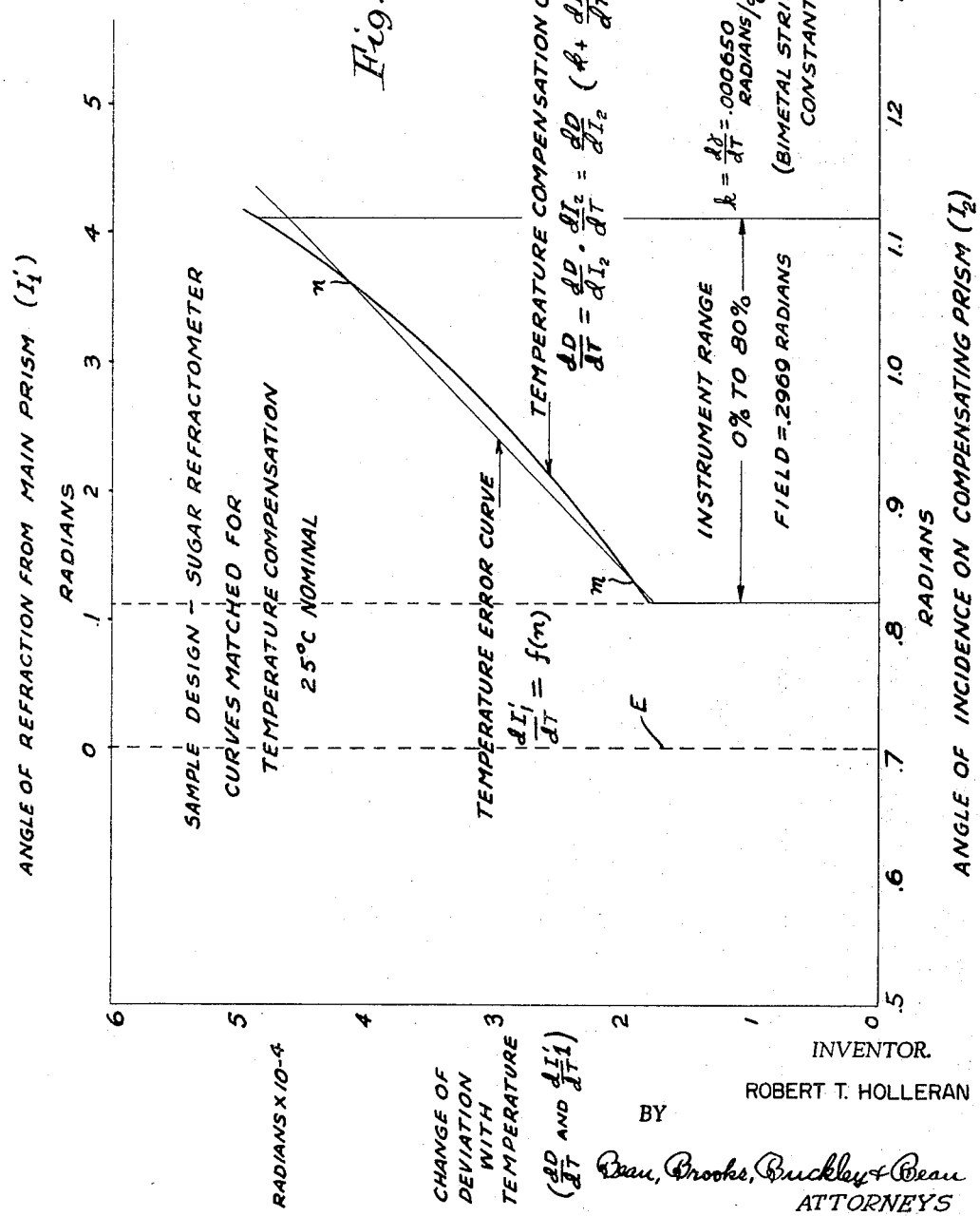

United States Patent Office 3,329,060
Patented July 4, 1967

3,329,060
TEMPERATURE COMPENSATED
REFRACTOMETER
Robert T. Holleran, Surry, N.H., assignor to American
Optical Company, Southbridge, Mass.
Filed Aug. 2, 1963, Ser. No. 299,521
6 Claims. (Cl. 88—14)

This invention relates to measuring instruments and pertains, more particularly to an instrument for measuring index of refraction.

The measurement of the index of refraction is useful in the chemical and process industries, for example, to determine the composition or concentration of various liquids. Although the measuring instrument may be calibrated in various units such as percent sugar, specific weight, iodine number, and the like, it is the refraction index of the material under test which is actually measured. Instruments of this type are well known. It is also well known to provide temperature compensation in instruments of this type, although temperature compensation has required, in the past, either resort to mechanical and/or optical complexity, or the utilization of special optical materials. The requirement for temperature compensation stems from the fact that the thermal expansion of liquids is substantial and, as a result, measurements taken under conditions in which the temperature may vary will yield unsatisfactory results unless the temperature variable is taken into consideration and corrected or compensated.

It is of primary concern in connection with this invention to provide an improved refractometer in which temperature compensation is effected so as to establish a condition in which exact compensation is obtained at two selected points of the instrument range, with very small residual errors at all other points.

It is a further object of this invention to achieve the aforementioned object with a relatively simple arrangement which is of rugged construction and which permits the instrument to rapidly accommodate and adjust to variations in temperature, thus enabling a highly accurate reading to be taken with minimum delay.

It is another object of this invention to provide an instrument which will provide highly accurate, temperature compensated readings and which embodies principles permitting construction such as to also compensate secondary temperature errors caused by change of temperature coefficient of refractive index of temperature.

Another object of this invention is to provide an instrument which will exhibit highly accurate, temperature compensated readings and which embodies principles permitting construction such as to also permit the scale to be of nearly uniform graduations throughout its range, thus enabling the same degree of reading accuracy throughout.

Other objects and advantages of the invention will appear from the description hereinbelow and the accompanying drawing wherein:

FIG. 2 is a graph illustrating certain physical characteristics of a specific embodiment of the invention;

FIG. 3 is a graph illustrating the variation of temperature error versus angle of deviation of the shadow line, without correction;

FIG. 4 is a graph illustrating the temperature compensating function of the present invention as compared to a function according to FIG. 2;

FIG. 5 is a chart illustrating actual temperature error as compared to the compensation achieved by the specific embodiment of the invention.

The field of view of a critical angle refractometer is divided sharply into light and dark and the position of the boundary therebetween is in accord with the index of refraction of the material being tested. Thus, assuming a fixed, nominal temperature for the material being tested, the boundary position is indicative of the index of refraction of the material under test. However, any given temperature change or variation from the stated nominal temperatures will effect a boundary position change which is not uniform over the range of the instrument since, not only does the refraction vary non-linearly with the index of the substance according to Snell's law, but also the temperature coefficient of index of refraction is not constant, being variable both with index of refraction and with temperature. In the specification including the claims, change in boundary line position caused by variation in temperature coefficient of index due to index of refraction change of the material being tested shall be termed "temperature error," while a change in boundary line position caused by variation in temperature coefficient of index due to temperature change shall be termed "secondary temperature error."

From a study of FIG. 3 wherein the temperature error $dI'/dT$ is plotted versus the angle of refraction (I') at the last face of the refractometer prism, it will be seen that the temperature error increases with the angle of refraction I'. The temperature error may also be represented as a function of the angle of refraction (I') at the last face of the refractometer prism $$\left[\frac{dI'}{dT}=f(I)\right]$$

The particular function shown in FIG. 3 represents the temperature error curve in connection with aqueous solutions of sugar over a range of 0–80% sucrose.

Figure 1:
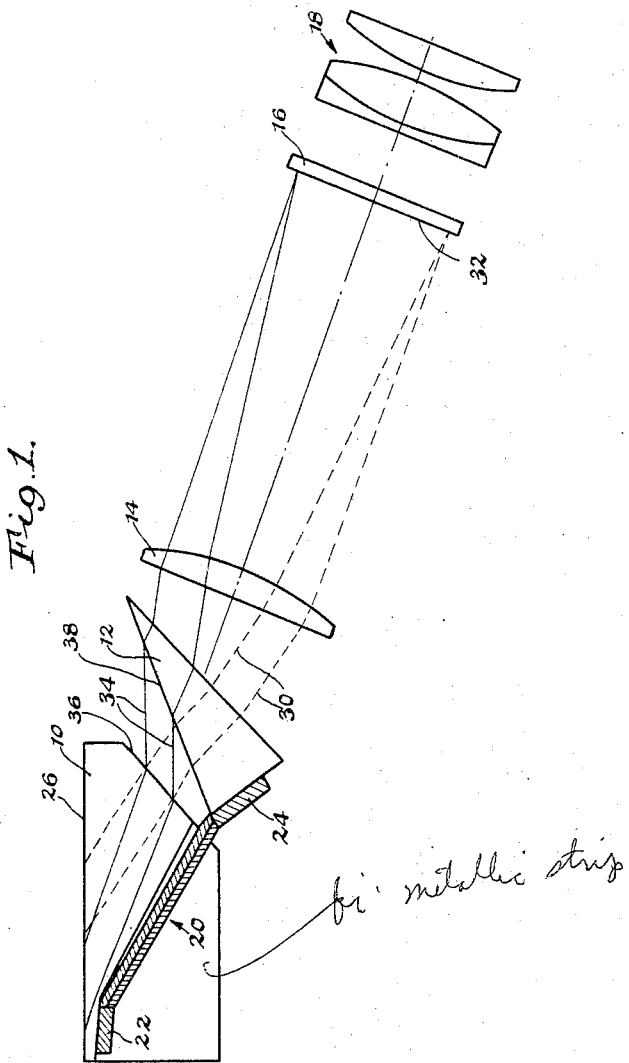
FIG. 1 is a diagrammatic view illustrating the optical elements according to this invention.

Within the field represented in FIG. 3, that is with the angle of refraction I' increasing with increase of index of refraction of the material being tested, the scale divisions will also be increasing from the low to the high end of the scale. With these relationships prevailing, it is possible to utilize a compensating prism or wedge in the optical system which, by virtue of its nominal tilt, index of refraction and wedge angle, will permit highly accurate temperature compensation over the range of the instrument by means of a relatively simple temperature-responsive movable mount for the compensating prism. Such a system is shown in FIG. 1 wherein there is shown a main prism 10, a movable compensating prism or wedge 12, an objective 14, a suitable scale-bearing reticle 16 and an ocular 18 for observing the reticle. The compensating prism 12 is movably mounted by means of a bimetallic strip 20 preferably anchored at 22 to the main prism 10 to achieve rapid and effective heat transfer to the strip and the opposite end is of course anchored, as at 24, to the compensating prism 12.

To illustrate a specific embodiment of the invention, the compensating prism 12 may be made from material having an index of refraction of 1.523 and provided with a prism angle of 0.4 radian, providing the characteristics shown in FIG. 2. In FIG. 2, the curve A represents the deviation effected by such a prism versus the angle of incidence I to the first face of the prism whereas the curve B represents the slope of curve A. By properly choosing the nominal angle of tilt for the compensating prism, that portion of curve B which will most closely compensate the temperature error curve of FIG. 3 may be selected to fall within the range of the instrument. Such a relationship is shown in FIG. 4 wherein the temperature error curve of FIG. 3 and the desired portion of the deviation rate curve B of FIG. 2 have been superimposed, it being noted that the temperature compensation curve of FIG. 4 is identical with that of FIG. 2 except that the latter curve has been multiplied by the total change of incidence per unit change of temperature, which is the sum of the error $dI'/dT$ and the bimetal strip constant K, as indicated. From FIG. 4, it will be evident that at the nominal temperature of 25° C., the first face of the compensating prism 12 will be tilted clockwise with respect to the last face of the main prism 10 by approximately 0.7 radian, as determined by the dashed line E in FIG. 4. Because of the characteristics and positioning of the compensating prism 12, the temperature compensation curve crosses the temperature error curve at two points, m and n, with very little residual error at any other point within the range of the instrument. Thus, as is indicated in FIG. 5, for any given index of refraction of the material being tested, within the range of the instrument, an exact reading will be obtained at either one of two different temperatures with little residual error at other points.

Referring again to FIG. 1, it will be appreciated that, although not shown, the first or contact face 26 of the main prism is adapted to be in contact with the material being tested and, unless used as a dipping refractometer, a cover glass would normally be used. As is well known, the boundary between the light and dark areas of the field will be determined by the maximum angle of the cones of light within the main prism 10 as established by the critical angle determined by the index of refraction of the material under test. In FIG. 1, collimated light as indicated for example by the dashed lines 30 correspond to the critical angle-limited rays at the boundary for the low end of the index of refraction scale 32 on the reticle 16; whereas the rays 34 correspond to a high index of refraction placing the critical angle-limited light at the boundary at the high end of the scale. The light refracted at the second face 36 of the main prism 10 and which may be imaged upon the scale 32 is always incident upon the first face 38 of the compensating prism at a finite angle of incidence, regardless of the index of refraction of the material being tested. This is of course a function of both the angle of refraction at the second face 36 of the main prism as determined between the limits of the instrument range and the nominal clockwise tilt of the first face 38 of the compensating prism 12 relative to the second face 36 of the main prism 10; and is necessary so as to select a steep enough portion of the curve B (FIG. 2) to closely match the temperature error curve (FIG. 3).

Since there are many portions of the curve B (FIG. 2) which will closely match the temperature error curve (FIG. 3), each corresponding to a different nominal tilt; and since the index of refraction of the compensating prism and its prism angle represent additional degrees of freedom for the system, the system may be tailored to obtain advantages other than that of temperature compensation. For example, it is usual practice in refractometers to provide a system such that the reticle scale 32 is characterized by continual expansion or escalation of its scale divisions from the low to the high end of the scale. This expansion may be reduced or even eliminated since the increasing deviation caused by the main prism 10 for increasing index of refraction of the material being tested is inherently opposed by the deviation effected by the compensating prism 12. At the same time, the well known color variation at the boundary which is effected by the field angle of the boundary can also be corrected. That is to say, the prism angle of the compensating prism 12 may be selected to compensate the color variation introduced by the main prism 10.

Figure 6:
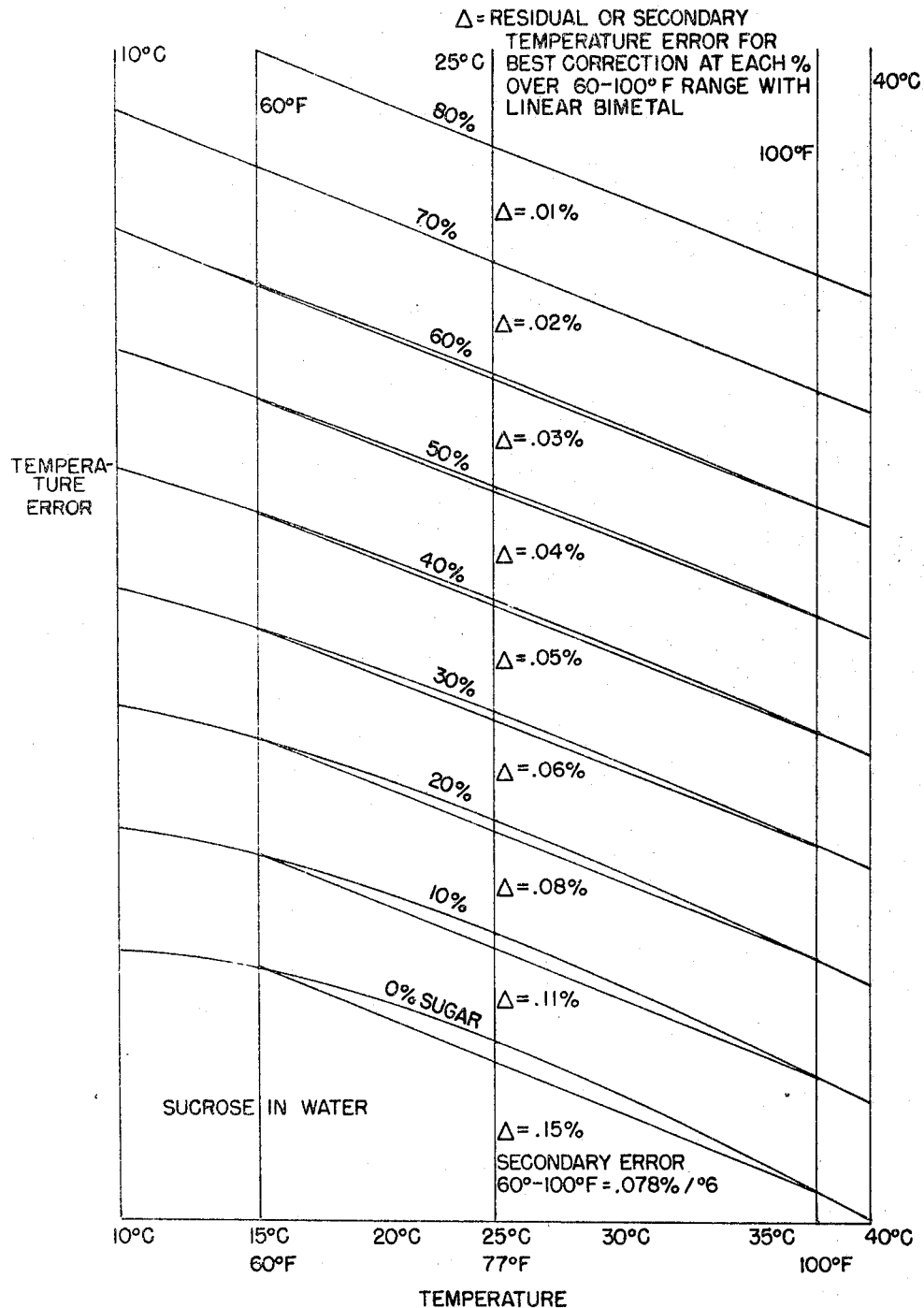
FIG. 6 is a graph illustrating the variation of secondary temperature error with temperature and at various concentrations of sucrose in water.

Further, compensation for secondary temperature error, see FIG. 6, which arises from change of temperature coefficient of index with temperature can be obtained by the use of a thermomotive element whose constant K varies suitably with the temperature. This is a useful device, for example, in an instrument of small range of low percentages of solids in water. For a wide-range instrument, say 0 to 85% sugar, the best that can be done with a variable k is to distribute the secondary error over the range so that it is nowhere greater than one-half the uncorrected value for 0%.

A further advantage of this invention stems from the fact that the movement which must be imparted by the thermomotive element is so little as to permit the use of a very short element. Thus, the heat transfer to this element and attainment of equilibrium will be very rapid, particularly if the element is anchored directly to the main prism 10 as shown.

It is to be understood that certain changes and modifications as illustrated and described may be made without departing from the spirit of the invention or the scope of the following claims.

I claim:

1. A refractometer comprising, in combination, a main prism having a face adapted to contact material whose index of refraction is to be tested; objective lens means; compensating prism means oriented at an angle of incidence optically between said main prism and said objective lens means; scale bearing reticle means disposed in the image plane of said objective lens means; said main prism, said compensating prism means and said objective lens means being aligned to direct and image light ray bundles contained within cones of critical angularity, as established by a material to be tested, on the scale bearing portion of said reticle means, and said angle of incidence being in a plane perpendicular to said face and parallel to the direction of said light ray bundles and further being predetermined to closely match the angular deviation of said compensating prism means to the expected temperature error for the range of refractive indices of the material to be tested; and, thermomotive means whose magnitude of motion with respect to temperatures varies with temperature for moving said compensating prism means in a path to correct for secondary temperature error.

2. A refractometer according to claim 1 wherein said thermomotive means is arranged for moving said compensating prism to vary the inclination thereof relative to said main prism.

3. A refractometer according to claim 1 wherein said thermomotive means is anchored to said main prism.

4. A refractometer of the type having a main prism providing a face for refracting shadow boundary-defining light at angles determined by the index of refraction of a material under test, objective lens means positioned in the path of light refracted by said main prism, and reticle means positioned in the focal plane of said objective lens means and having a scale; the improvement comprising a temperature-compensating wedge disposed between said main prism and said objective lens means in said path of light; and, mounting means mounting said wedge at an initial angle of incidence, said angle of incidence being in a plane perpendicular to said face and parallel to said path and further being predetermined to closely match the angular deviation of said wedge to the expected temperature error for the range of refractive indices of said material under test, and said mounting means being temperature-responsive to vary the angle of incidence in response to temperature changes and having a magnitude of motion with respect to temperature which varies with temperature to compensate for secondary temperature errors.

5. A refractometer according to claim 4 wherein said mounting means includes temperature-responsive thermomotive means for moving said wedge to vary the inclination thereof relative to said main prism.

6. The invention according to claim 5 wherein said thermomotive means is anchored to said main prism.

References Cited
UNITED STATES PATENTS 2,934,992  5/1960  Goldberg _____ 88—14

JEWELL H. PEDERSEN, *Primary Examiner.*

DAVID H. RUBIN, *Examiner.*

B. J. LACOMIS, *Assistant Examiner.*